F. DITCHFIELD.
CAR DOOR OPERATING MECHANISM.
APPLICATION FILED MAR. 13, 1911.

1,041,045.

Patented Oct. 15, 1912.
2 SHEETS—SHEET 2.

WITNESSES

INVENTOR
FRANK DITCHFIELD.

UNITED STATES PATENT OFFICE.

FRANK DITCHFIELD, OF MONTREAL, QUEBEC, CANADA.

CAR-DOOR-OPERATING MECHANISM.

1,041,045.   Specification of Letters Patent.   Patented Oct. 15, 1912.

Application filed March 13, 1911. Serial No. 613,969.

*To all whom it may concern:*

Be it known that I, FRANK DITCHFIELD, of the city of Montreal, in the Province of Quebec and Dominion of Canada, have invented certain new and useful Improvements in Car-Door-Operating Mechanism, of which the following is a full, clear, and exact description.

This invention relates to that class of cars known as convertible dump cars, that is, a car provided with elements capable of being arranged in one position to form a hopper-bottom dumping car, and in another position to form a flat bottom car of the gondola type.

The main object of the invention is to provide a car of simple, economical, and efficient construction that can be used as an ordinary flat-bottom car and loaded and unloaded in the usual manner; that can be quickly converted into a side dumping car, and that can further be converted into a hopper-bottom car and unloaded automatically along the central axis thereof, thus combining a structure capable of carrying several different classes of freight.

A further object is to provide a car that can be loaded as a flat bottom car and unloaded either from the sides or from the hopper bottom, as is found most desirable, a result that, to my knowledge, has never been accomplished heretofore.

A still further object is to provide a car in which the elements comprising the floor may be converted into the hopper bottom, thus eliminating the permanent or stationary hopper device heretofore used. This feature of construction I believe to be new in cars of this type.

Another object is to provide a simple and efficient mechanism having great strength and durability for arranging and holding the elements of the car in any desired relation.

The invention consists essentially in a car having its sides hinged at the top and capable of being swung either outwardly or inwardly, as desired. The floor comprises longitudinal plates adapted, when overlapped and locked in position, to form a flat or plain floor surface. These plates are hinged in such a manner that when the central overlapping portions are lowered, the floor is converted into a hopper under the car and capable of being separated at any angle to discharge the contents centrally between the rails. The underframe of the car is similar to the ordinary underframes of cars of this type.

The invention consists further in the features, combinations and details of construction hereinafter described.

Figure 1:
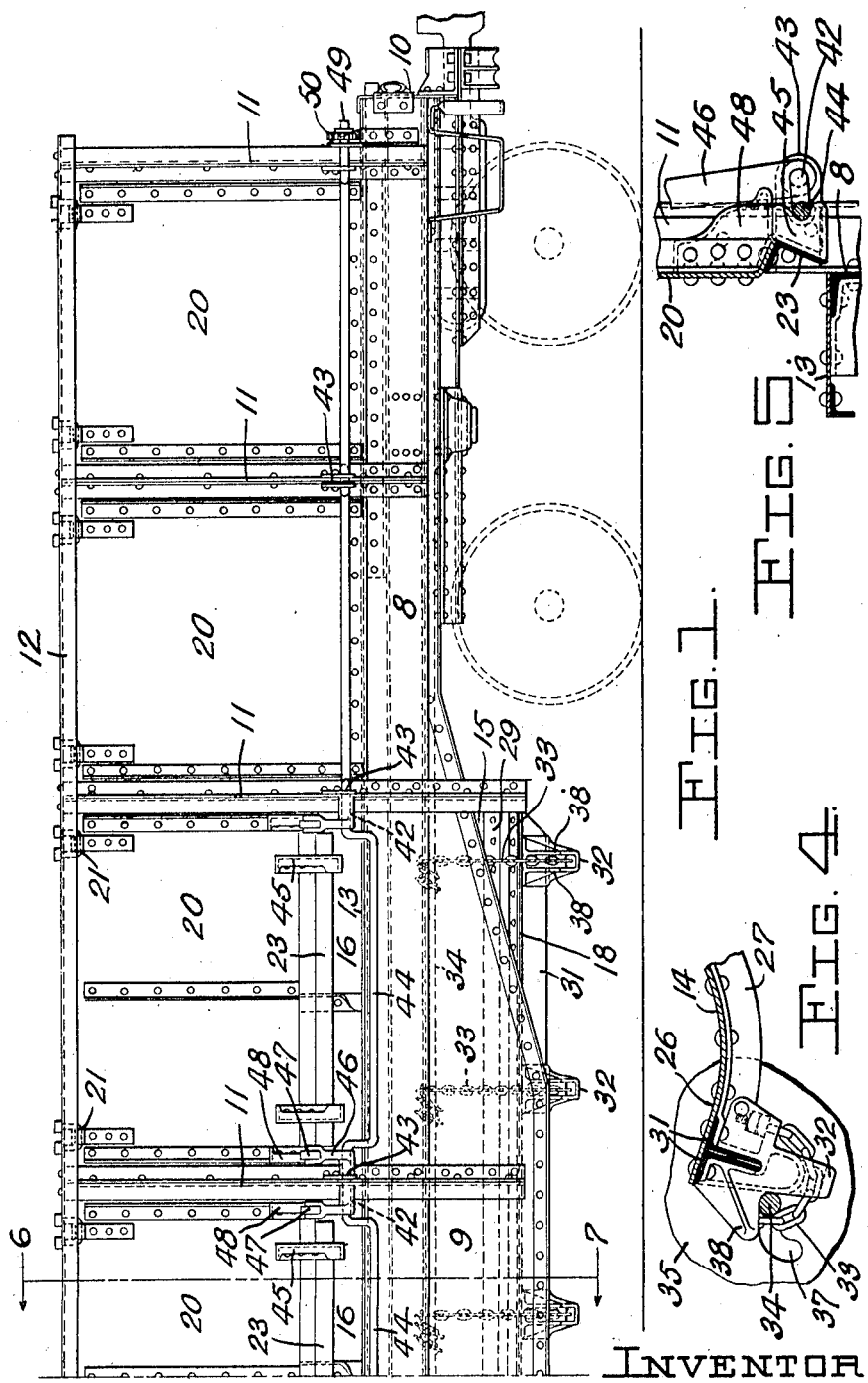
Figure 2:
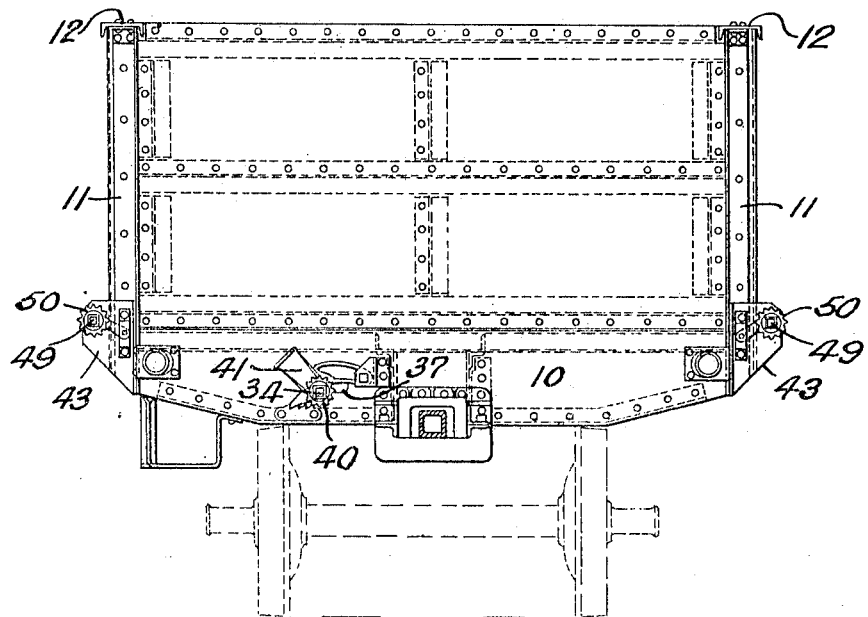
Figure 3:
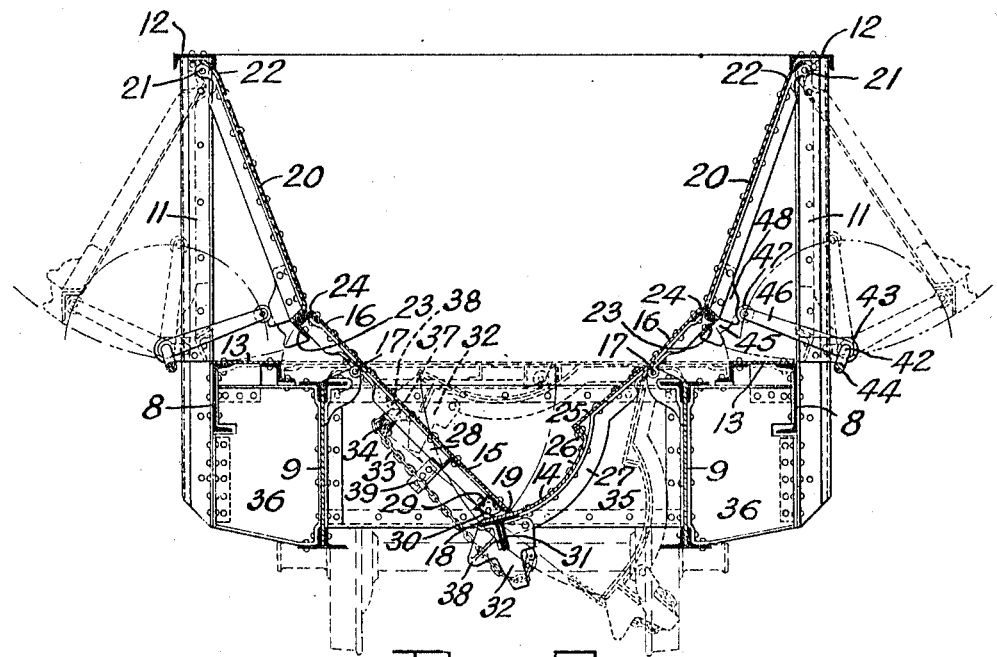

In the drawings, in which similar numerals refer to corresponding parts throughout all the figures:—Figure 1 is a partial side elevation of a car constructed according to my invention. Fig. 2 is an end elevation of the same. Fig. 3 is a transverse section on the line 6—7 of Fig. 1. Fig. 4 is a detail view of the floor door lock mechanism shown in Fig. 3. Fig. 5 is a similar view of the side lock mechanism.

Referring to the parts, 8 designates the side sills and 9 the center sill of a car, which are connected by end sills 10, and support pillars 11 which carry on their upper extremities a rail, 12, which forms the upper edge of the car body.

In the dumping portion of the car, the floor is formed of a pair of longitudinal jamb plates 13 located on either sides of the longitudinal axis of the car and preferably equidistant therefrom, and overlapping doors 14, 15 and 16 hinged at 17 which, when in a horizontal position, occupy the space between the jamb plates 13, as shown in dotted lines in Fig. 3. It will be seen in this figure that the doors are hinged inside the side plates of the center sill. The doors 16 outside the hinges 17 are separated from the main doors 14 and 15 though mounted on the same hinges 17. This division of the floor is necessary in order that when the doors 14 and 15 are lowered, the portions 16 outside the hinges will not rise and leave a space between themselves and the side doors or jamb plates on which they rest, through which a portion of the contents of the car would fall. The doors are preferably of unequal width in order that when they are lowered to form a hopper under the car, as shown in full lines in Figs. 1 and 3, the inner edges 18 of one door will extend beyond the inner edge 19 of the other door, in order that the extending portion of the door may be directly engaged by the operating mechanism without the use of any intermediary parts.

The sides of the car adjacent the floor doors are formed of doors 20 hinged at their upper edges 21 to the rails 12. The upper edges of the doors 20 are curved outwardly at 22 so as to slide under the rails 12 and allow the doors to be swung inwardly. The lower edges of said doors are provided with angles 23 arranged so as to form recesses in which the outer edges 24 of the floor doors 16 engage. When in their vertical position, the lower edges of the side doors will form a tight joint with the jamb plates 13. The side doors may also be swung outwardly in order to discharge the contents of the car at the sides thereof. The overlapping portions of the floor doors will be arranged so that when the doors are in their horizontal overlapping position, the floor formed thereby will present a plain, unobstructed upper surface. This special construction of the floor doors is of great importance since it not only allows the doors to form the level floor above referred to but also, allows the doors to be lowered to form the hopper bottom and raised to form the flat floor, with a minimum of friction and resistance. The construction, furthermore, provides for an opening of increased size when the hopper is dumped. This particular construction is chiefly embodied in the door 14 which is preferably formed of two plates 25 and 26, united longitudinally of the car. The plate 25 extends from the hinges approximately to the center of the door and is then turned downwardly to form a flange of approximately the same depth as the thickness of the door 15. The other plate 26 is curved, as shown in Fig. 3, and provided with an upturned flange which is riveted to the flange of the plate 25, thus forming the door 14 with an off-set portion for the reception of the door 15. A plurality of suitable stiffening members 27 are secured to the under side of the door 14, to follow the contour of the plates. The door 15 is formed from one or more plates and presents a plain upper surface, the plates being stiffened by members 28 attached to the under side thereof. An angle 29 is also attached under the free edge 19 of the door 15 and carries between the flanges thereof a plurality of rollers 30 adapted to travel on the curved plate 26 of the door 14.

It will be noticed in Fig. 3 that, by reason of the curvature of the plate 26, the angle at the intersection of the doors is considerably greater than a right angle so that when an upward motion is imparted to the door 14, the rollers 30 of the door 15 will start easily and roll up over the plate 26, the curvature being such that the door 15 is finally brought into the same plane with the plate 25 of the door 14. In this manner the movement of the door 15 is controlled directly by the door 14 without the use of any intermediate mechanism to lift or start the door 15 thus simplifying the device and reducing the possibility of derangement to a minimum. The edge 18 of the door 14 is stiffened by a pair of angles 31 placed flange to flange, the principal purpose of these angles, however, being to provide attachments for the chain anchors 32. These anchors are of any suitable design, as best shown in Fig. 4, and serve to distribute the pull of the chains 33 over a considerable area, so as to preclude any possibility of bending or tearing the plate 26. The chains 33 are attached at one end to the anchors 32, as before stated, and at the other end to a shaft 34 lying longitudinally under the car floor.

As many sets of doors as desired are arranged in the car and between each set of doors is a strong transom 35 extending between the webs of the center sill. These transoms are continued beyond the center sills by plates 36 which extend to the side sills and to the lower ends of the pillars 11. The shaft 34 may be integral throughout the whole length of the car, or may be divided at the center of the car so as to allow each end of the car to be operated separately. This shaft is of the creeping type, that is, it is mounted in curved slots 37 in the transoms and creeps or travels in the slots when the chains 33 are tightened or loosened. In this instance when the doors 14 and 15 are to be raised from the hopper to the flat floor arrangement shown in dotted lines in Fig. 3, the shaft 34 is revolved to wind up the chains 33 and raise the doors, the shaft meanwhile remaining at the outer or lower ends of the slots. When the doors are raised, further revolution of the shaft causes it to be drawn up in the slots toward the longitudinal center of the car, so that it finally slips under the ears 38 of the anchor. The weight of the doors and loading in the car is thus thrown directly on the shaft and not through the medium of the chains, so that there is no tendency to revolution which would allow the shaft to creep and release the doors.

By reversing the revolution of the shaft, the doors may be lowered to form the hopper bottom, and the doors 14 still further lowered to dump the hopper, as shown in dotted lines in Fig. 3. This method of dumping may also be employed for the flat floor arrangement. Stops 39 are provided on the transoms 35 to support the doors 15 and prevent the same from falling against the shaft 34 and bending it. Any suitable pawl and ratchet device 40 is provided at the end of the shaft 34 to lock the same against revolution or travel in the slots 37 when desired. A socket 41 of suitable design is also provided in which a lever may be inserted for revolving the shaft.

The operating mechanism of the side doors 20 is comparatively simple and consists essentially of a shaft 42 disposed longitudinally of the car at each side thereof, said shafts being journaled in brackets 43 fixed to the pillars 11. The portions 44 of the shafts 42 opposite the doors 20 are offset so as to form cranks which coöperate with recessed blocks 45 fixed to the lower edges of the doors. Between the offset portions of the shafts and the brackets 43, levers 46 are fixed to the shaft at a suitable angle to the cranks 44. The extremities of the levers are provided with rollers 47, which travel on the outer sides of the door and are adapted to coöperate with the recessed blocks 48 on the doors and also with the angles 23 forming the lower edges of the doors. The extremities 49 of the shafts 42 are squared to receive any suitable operating crank or lever and are provided with any of the usual forms of pawl and ratchet devices 50 to lock the shaft against revolution.

If it is desired to arrange the car as a hopper car, the floor doors 14 and 15 are manipulated as previously described, the small floor doors 16 raised as in Fig. 3, and the shafts 42 rotated so that the levers 46 force the side doors 20 inwardly until the rollers 47 come to rest in the recessed blocks 48, and the outer edges 24 of the doors 16 rest on the angles 23 at the bottom of the side doors. It will be readily seen that the angle between the levers and doors is such that the levers support the doors without any tendency to revolve the shafts 42. When the car is arranged as a gondola, the side doors are vertical and the cranks or offset portions 44 of the shafts engage the recessed blocks 45 to hold the doors against outward movement, the cranks being at such an angle to the doors that there is no tendency to revolve the shaft. In emptying the car by plowing or shoveling, the shafts are first rotated to release the doors which are then opened outwardly and the levers 46 raised until the rollers 47 thereof engage between the flange of the angles 23 on the edge of the doors, thus holding the doors open, as shown in dotted lines in Fig. 3.

The operation of this device and the various advantages thereof will be readily understood from the foregoing description and will not require further explanation.

Having thus described my invention, what I claim is:—

1. In a car of the class described, the combination with a supporting framework of a pair of floor doors, a creeping shaft movable under said doors to lock the same in overlapping horizontal position, chains wound on said shaft for raising the doors and drawing the shaft under the doors, and means for holding the shaft under said doors.

2. In a car of the class described, the combination with a supporting framework, of a pair of floor doors, one of said doors having a recess for the reception of the other door, and a creeping shaft movable under the recessed door to lock both doors in closed position.

3. In a car of the class described, the combination with a supporting framework, of a pair of floor doors hinged adjacent the sides of the car, one of said doors having a recess for the reception of the other door, a creeping shaft, chains wound on said shaft, for raising the doors to a horizontal position, and drawing the shaft under the recessed door to lock the doors in a horizontal position.

4. In a convertible car, a supporting framework, a pair of dumping doors hinged adjacent the sides of the car, one of said doors being curved to form a longitudinal recess for the reception of the other door, a revoluble shaft extending longitudinally of the car, chain anchors on the edge of said curved door, and chains connecting the anchors and shaft whereby the doors may be raised and the shaft drawn under the anchors to lock the doors in elevated position.

5. In a convertible car, a supporting framework, a floor door hinged to said framework adjacent one side of the car having a plane portion adjacent the hinges, and a longitudinally recessed portion adjacent the free edge of the door, a second door hinged adjacent the opposite side of the car and having the free edge thereof normally resting on the recessed portion of the first door, a revoluble shaft extending longitudinally of the car, chain anchors on the edge of said first door, and chains connecting the anchors and shaft whereby the doors may be raised and the shaft drawn under the anchors to lock the doors in elevated position.

6. In a convertible car, the combination with a supporting framework, of a pair of floor doors hinged adjacent the sides of the car, one of said doors having a recess for the reception of the other door, rollers on the second door adapted to travel in the recess of the first door, a creeping shaft, chains wound on said shaft and attached to the recessed door.

7. In a convertible car, the combination with a supporting framework, of a floor door hinged adjacent one side of the car, a second floor door hinged adjacent the opposite side of the car having the inner portion thereof transversely curved and offset to form a recess for the first door, and means for raising and locking said doors in horizontal position.

8. In a convertible car, the combination with a supporting framework, of a floor door hinged adjacent one side of the car having a curved portion forming a longitudinal recess, a second floor door hinged adjacent the opposite side of the car, rollers on said second door traveling on the curved portion of the first door and supporting the second door on the first door at an angle greater than 90°, anchors on the first door, a shaft, and chains fixed to said anchors and wound on the shaft to raise the first door whereby the second door is raised to occupy the recess and form a flat floor.

9. In a convertible car, the combination with a supporting framework, of floor doors hinged adjacent the sides of the car, one of said doors having a recess for the reception of the other door, chain anchors fixed to said recessed door, ears on said anchors projecting beyond the edge of the door, a creeping shaft, chains wound on said shaft and attached to the anchors to raise the doors to horizontal position and draw the shaft under the ears of said anchors to lock the doors in horizontal position, and means for holding the shaft under the anchor ears.

In witness whereof I have hereunto set my hand in the presence of two witnesses.

FRANK DITCHFIELD.

Witnesses:
 STUART R. W. ALLEN,
 E. R. MCKENZIE.